United States Patent
Deo et al.

(10) Patent No.: US 10,308,495 B2
(45) Date of Patent: Jun. 4, 2019

(54) DISPENSING MACHINE SANITIZATION USING ELECTRO-CHEMICALLY ACTIVATED LIQUID

(71) Applicant: PepsiCo, Inc., Purchase, NY (US)

(72) Inventors: Indrani Deo, Ossing, NY (US); Dmitry Falkov, St. Petersburg (RU); Georgy Martsinovskiy, St. Petersburg (RU); Sergei Markosov, St. Petersburg (RU); Mikhail Verbitsky, Stoughton, MA (US)

(73) Assignee: PepsiCo, Inc., Purchase, NY (US)

( * ) Notice: Subject to any disclaimer, the term of this patent is extended or adjusted under 35 U.S.C. 154(b) by 214 days.

(21) Appl. No.: 14/831,993

(22) Filed: Aug. 21, 2015

(65) Prior Publication Data
US 2015/0360925 A1   Dec. 17, 2015

Related U.S. Application Data (63) Continuation of application No. 13/665,026, filed on Oct. 31, 2012, now Pat. No. 9,144,346.
(Continued)

(51) Int. Cl.
*B67D 1/07* (2006.01)
*A47J 31/60* (2006.01)
(Continued)

(52) U.S. Cl.
CPC .......... *B67D 1/07* (2013.01); *A47J 31/60* (2013.01); *B08B 9/08* (2013.01); *B67D 1/0021* (2013.01);
(Continued)

(58) Field of Classification Search
CPC ....................................... B67D 1/07
See application file for complete search history.

(56) References Cited

U.S. PATENT DOCUMENTS

| | | |
|---|---|---|
| 4,322,291 A | 3/1982 | Ho |
| 4,757,921 A | 7/1988 | Snowball |

(Continued)

FOREIGN PATENT DOCUMENTS

| | | |
|---|---|---|
| DE | 20 2004 010572 U1 | 11/2004 |
| DE | 10 2009 025155 A1 | 12/2010 |

(Continued)

OTHER PUBLICATIONS

Feb. 6, 2013—(WO) International Search Report and Written Opinion—Application PCT/US2012/062829.

*Primary Examiner* — Donald R Spamer
(74) *Attorney, Agent, or Firm* — Sterne, Kesller, Goldstein & Fox, P.L.L.C.

(57) ABSTRACT

An apparatus comprises a dispensing system and a sanitizing system. The apparatus has a dispensing mode and sanitizing mode. The dispensing system may comprise a first valve and at least one component, the at least one component comprising an inner surface. The first valve has an open position to send a free-flowing material to the at least one component when the apparatus is in the dispensing mode, in a closed position when the combination is in the sanitizing mode. The sanitizing system comprises a processing unit, having an electrochemical cell configured to produce an anolyte solution and a catholyte solution. The sanitizing system comprises a second valve having an open position to send the anolyte solution and the catholyte solution to the at least one component when the apparatus is in the sanitizing mode. The second valve has a closed position when the apparatus is in the dispensing mode.

19 Claims, 3 Drawing Sheets

Related U.S. Application Data (60) Provisional application No. 61/554,359, filed on Nov. 1, 2011.

(51) Int. Cl.
  *B67D 3/00* (2006.01)
  *B67D 1/00* (2006.01)
  *B08B 9/08* (2006.01)
  *A47J 31/00* (2006.01)
  *B05B 15/55* (2018.01)

(52) U.S. Cl.
  CPC ............ *B67D 3/0058* (2013.01); *A47J 31/00* (2013.01); *B05B 15/55* (2018.02); *B67D 2001/075* (2013.01); *B67D 2210/00013* (2013.01); *Y10T 137/0402* (2015.04)

(56) References Cited

U.S. PATENT DOCUMENTS

| | | | |
|---|---|---|---|
| 4,867,052 A | 9/1989 | Cipelletti | |
| 4,969,991 A | 11/1990 | Valadez | |
| 5,064,097 A | 11/1991 | Brog et al. | |
| 5,316,673 A | 5/1994 | Kohlmann et al. | |
| 5,339,874 A | 8/1994 | Cragun | |
| 5,427,667 A | 6/1995 | Bakhir et al. | |
| 5,450,882 A | 9/1995 | Cragun | |
| 5,484,538 A | 1/1996 | Woodward | |
| 5,628,888 A | 5/1997 | Bakhir et al. | |
| 5,871,623 A | 2/1999 | Bakhir et al. | |
| 5,932,171 A | 8/1999 | Malchesky | |
| 6,019,032 A | 2/2000 | Arksey | |
| 6,077,427 A | 6/2000 | Burrows | |
| 6,216,918 B1 | 4/2001 | Saveliev et al. | |
| 6,354,341 B1 | 3/2002 | Saveliev et al. | |
| 6,382,467 B2 | 5/2002 | Saveliev et al. | |
| 6,449,970 B1 | 9/2002 | Gagliano | |
| 6,483,119 B1 | 11/2002 | Baus | |
| 6,695,168 B2 | 2/2004 | Pinedjian et al. | |
| 7,347,345 B2 | 3/2008 | Guerrero et al. | |
| 7,448,314 B2 | 11/2008 | Ioannone et al. | |
| 7,879,156 B2 | 2/2011 | Coccia et al. | |
| 9,499,422 B1 * | 11/2016 | Carson | C02F 1/72 |
| 2001/0010318 A1 | 8/2001 | Saveliev et al. | |
| 2002/0083842 A1 | 7/2002 | Kown | |
| 2005/0247614 A1 | 11/2005 | Wiemer et al. | |
| 2006/0175352 A1 | 8/2006 | Emmendorfer et al. | |
| 2007/0137726 A1 | 6/2007 | Yan | |
| 2008/0142037 A1 | 6/2008 | Dempski et al. | |
| 2010/0101929 A1 | 4/2010 | Kamen et al. | |
| 2010/0176147 A1 | 7/2010 | Segers | |
| 2010/0247374 A1 | 9/2010 | Pellet | |
| 2012/0228145 A1 | 9/2012 | Guastella et al. | |

FOREIGN PATENT DOCUMENTS

| | | |
|---|---|---|
| EP | 1 101 544 A1 | 5/2001 |
| GB | 2462278 A | 2/2010 |
| WO | 2011131963 A2 | 10/2011 |

* cited by examiner

DISPENSING MACHINE SANITIZATION USING ELECTRO-CHEMICALLY ACTIVATED LIQUID

CROSS REFERENCE TO RELATED APPLICATIONS

This application is a continuation and claims priority to U.S. application Ser. No. 13/665,026, filed Oct. 31, 2012, and entitled "Dispensing Machine Sanitization Using Electrochemically Activated Liquid," which is a non-provisional of and claims priority to provisional U.S. application Ser. No. 61/554,359, filed Nov. 1, 2011, and entitled "Dispensing Machine Sanitization Using Electrochemically Activated Liquid," the entire disclosures of which are hereby incorporated by reference in their entirety and for all purposes.

FIELD OF THE INVENTION

This disclosure relates generally to generating and using electrochemically activated liquids, such as electrochemically activated water, for sanitization of dispensing systems, e.g., free-flowing food dispensing systems, such as beverage dispensers used in cafeterias, restaurants (including fast food restaurants), theatres, convenience stores, gas stations, and other entertainment and/or food service venues.

BACKGROUND

Dispensing systems, e.g., free-flowing food dispensing systems, including beverage dispensers, periodically need to be sanitized. Traditional methods of sanitizing dispensing systems utilize disinfecting liquids, which typically include antimicrobial agents, liquid detergents, and surfactants. A disadvantage of conventional systems is related to the need for reloading or recharging the conventional disinfecting and cleaning liquids to a sanitizing system. The reloading or recharging of disinfecting and cleaning liquids complicates system maintenance and hinders automation of sanitizing process.

Therefore, there is a need for new disinfection and sanitization apparatus and methods that would eliminate the need for reloading of disinfecting and cleaning liquids as in existing apparatuses and methods. Further, eliminating the need for reloading of disinfecting and cleaning liquids, and would also enable easier automation of sanitization of beverage dispensing systems.

SUMMARY

In one aspect the present disclosure provides an apparatus comprising a dispensing system in combination with a sanitizing system. The combination has a dispensing mode and sanitizing mode. The dispensing system comprises a first valve and at least one component, the at least one component comprising an inner surface. The first valve has an open position to send a free-flowing material to the at least one component when the combination is in the dispensing mode. The first valve has a closed position when the combination is in the sanitizing mode. The sanitizing system comprises a processing unit. The processing unit comprises an electrochemical cell configured to produce an anolyte solution and a catholyte solution, a first tank configured to receive the anolyte solution, and a second tank configured to receive the catholyte solution. The sanitizing system comprises a second valve. The second valve has an open position to send the anolyte solution from the first tank and the catholyte solution from the second tank to the at least one component when the combination is in the sanitizing mode. The second valve has a closed position when the combination is in the dispensing mode.

The above and other aspects, features and advantages of the present disclosure will be apparent from the following detailed description of the illustrated embodiments thereof which are to be read in connection with the accompanying drawings.

DETAILED DESCRIPTION

The present disclosure relates to sanitizing and/or cleaning systems, and more particularly to systems that generate a working liquid that has cleaning and/or sanitizing properties.

In accordance with aspects of the disclosure, electrochemical activation of a liquid, e.g. water, may be used to generate a working liquid that has cleaning and/or sanitizing properties. In accordance with aspects of the disclosure, electrochemical processes may be performed in a processing, e.g., and an electrolyzer. Electrochemical processes in accordance with aspects of the present disclosure may comprise:

a. oxidation of water at the anode: $2H_2O-4e=4H^++O_2$;
b. reduction of water at the cathode: $2H_2O+2e=H_2+2OH^-$;
c. formation of gaseous chlorine in chloride solutions at the anode: $2Cl^-=2e+Cl_2$;
d. formation of highly active oxidants in an anodic chamber: $Cl_2O$, $ClO_2$, $ClO^-$, $HClO$, $Cl.$, $O_2.$, $O_3$, $HO_2$, $OH.$; and
e. formation of highly active reductants in a cathodic chamber: $OH^-$, $H_3^-$, $O_2^-$, $H_2$, $HO_2.$, $HO_2^-$, $O_2^-$.

In accordance with aspects of the present disclosure, an anolyte solution may be generated, and a catholyte solution may be generated. A sufficient amount of strong oxidants and free radicals in an anolyte solution provide antimicrobial properties. Catholyte solution comprising a sufficient amount of reductants provides washing properties. Anolyte and catholyte solutions have considerable change in pH and oxidation reduction potential ("ORP") with respect to their initial values in water: in an anolyte solution, pH value is reduced and ORP is elevated up to the extreme positive (oxidant) value; in a catholyte solution, pH is increased and ORP is reduced to the extreme negative (reductant) value. The magnitude of the change depends on initial mineralization of the water and parameters of an electrolyzing process.

In accordance with at least one aspect of the present disclosure, a regular water supply may be used in combination with a device for electrochemical activation of water. The electrochemically activated water may be used to eliminate the need for reloading of conventional disinfecting and cleaning liquids. The electrochemically activated water may be used to also enable easier automation of sanitization of free-flowing or liquid dispensing systems. Liquid dispensing systems may comprise free-flowing food dispensing systems, e.g. beverage dispensing systems.

In accordance with at least one aspect of the present disclosure, effective integration of a unit for production of electrochemical water solution with a liquid dispensing system may be provided, and the integration or combination can be used to provide reliable and automated sanitization.

An aspect of the present disclosure is to provide a fully automated sanitizing system that modifies properties of water in such a way that the water acquires disinfecting and/or cleaning properties. As a result the sanitizing system does not require any consumable disinfecting and/or cleaning materials.

In an embodiment, water can be modified or treated in such way that the water acquires antimicrobial and cleaning properties as a result of electrochemical activation of the water. In an embodiment, electrochemical activation may occur in an electrolyzer. The electrochemically-activated water may be pumped through a liquid dispensing system in order to sanitize and clean the inner surface(s) of pipes, chambers, reservoirs, pumps, valves and other components of the dispensing system. Use of regular a water supply can eliminate the need for reloading of disinfecting and cleaning liquids, thus enabling easier automation of the sanitization process.

A benefit of the present disclosure is that disinfecting and washing solutions can be produced from a conventional drinking water source, e.g., municipal tap water. A benefit of the present disclosure is that electrochemically-activated water can be safer for consumers and operators than conventional disinfecting and/or cleaning materials typically used for sanitization of beverage dispensing systems. Thus, a residual amount of electrochemically-activated water in a beverage dispensing system after a sanitizing procedure is completed can be safer than a residual amount of conventional disinfecting and/or cleaning materials typically used for sanitization of beverage dispensing systems.

In accordance with an aspect of the disclosure, a sanitization method comprises (1) subjecting a liquid to electrochemical treatment for time sufficient to provide electrochemical activation of the liquid and produce ions in the liquid, and (2) sending the electrochemically-activated liquid through a beverage dispensing system. In an embodiment, the liquid comprises water.

Pumping the electrochemically-activated liquid through the beverage dispensing system can be arranged in such way that the electrochemically-activated liquid, e.g., electrochemically-activated water, circulates though the beverage dispensing system and returns to the sanitizing system. By re-circulating the electrochemically-activated liquid, the liquid may again be subjected to electrochemical treatment to replenish ions and chemical radicals in the liquid, and the electrochemically-activated liquid may be sent again through the beverage dispensing system. Alternatively, a single pass of the electrochemically-activated liquid water through the dispensing system can be arranged. After the sanitizing procedure is completed, used liquid, e.g., water, may be disposed into a drain, or further treated as may be desired.

In accordance with an aspect of the disclosure, a method for modifying water may be provided such that the water acquires antimicrobial and cleaning properties. In an embodiment, water properties may be modified by saturation of water with ions and chemical radicals produced by electrochemically activating water.

In an embodiment, liquid properties can be modified by saturation of the liquid or water with ions and chemical radicals produced by an electrochemical cell. Electrochemically-activated liquid produced by the electrochemical cell may be pumped through a liquid dispensing system in order to sanitize and clean the inner surface(s) of pipes, chambers, reservoirs, pumps, valves and other components of the dispensing system. Use of regular water supply may eliminate the need for reloading of disinfecting and cleaning liquids, thus enabling easier automation of sanitizing process. The sanitizing method may comprise producing an anolyte solution and a catholyte solution, and pumping those solutions through liquid dispensing system at different times or at the same time.

In accordance with aspects of the present disclosure, an electrochemically-activated liquid, e.g., electrochemically-activated water, may be generated by a processing unit or electrochemical cell and may be circulated inside a beverage dispensing system. In an embodiment, electrochemically-activated water may be circulated inside the beverage dispensing system for a sufficient time to provide sanitization of the beverage dispensing system so that free-flowing material, such as free-flowing food (e.g., a beverage) can be dispensed from the dispensing system without being contaminated by components of the dispensing system, or other materials within components of the dispensing system.

In accordance with at least one aspect of the present disclosure, electrochemically-activated water may be circulated inside the beverage dispensing system for not longer than 30 minutes before it is disposed to a drain or may be returned to the processing unit for replenishment of ions and chemical radicals. By maintaining circulation of the electrochemically-activated water to not longer than 30 minutes may provide greater antimicrobial efficacy of the ozone-containing water than circulating the electrochemically-activated water for longer than 30 minutes.

After the electrochemically-activated liquid or electrochemically-activated water is circulated inside the beverage dispensing system for sufficient time for the beverage dispensing system to be sanitized, the electrochemically-activated water may be either returned to the electrochemical cell, or disposed to a drain. Disposing the electrochemically-activated water to the drain after one pass, and generating a new electrochemically-activated water to circulate through the beverage dispensing system may provide better antimicrobial efficacy than simply recirculating the older electrochemically-activated water through the beverage dispensing system.

Figure 1:
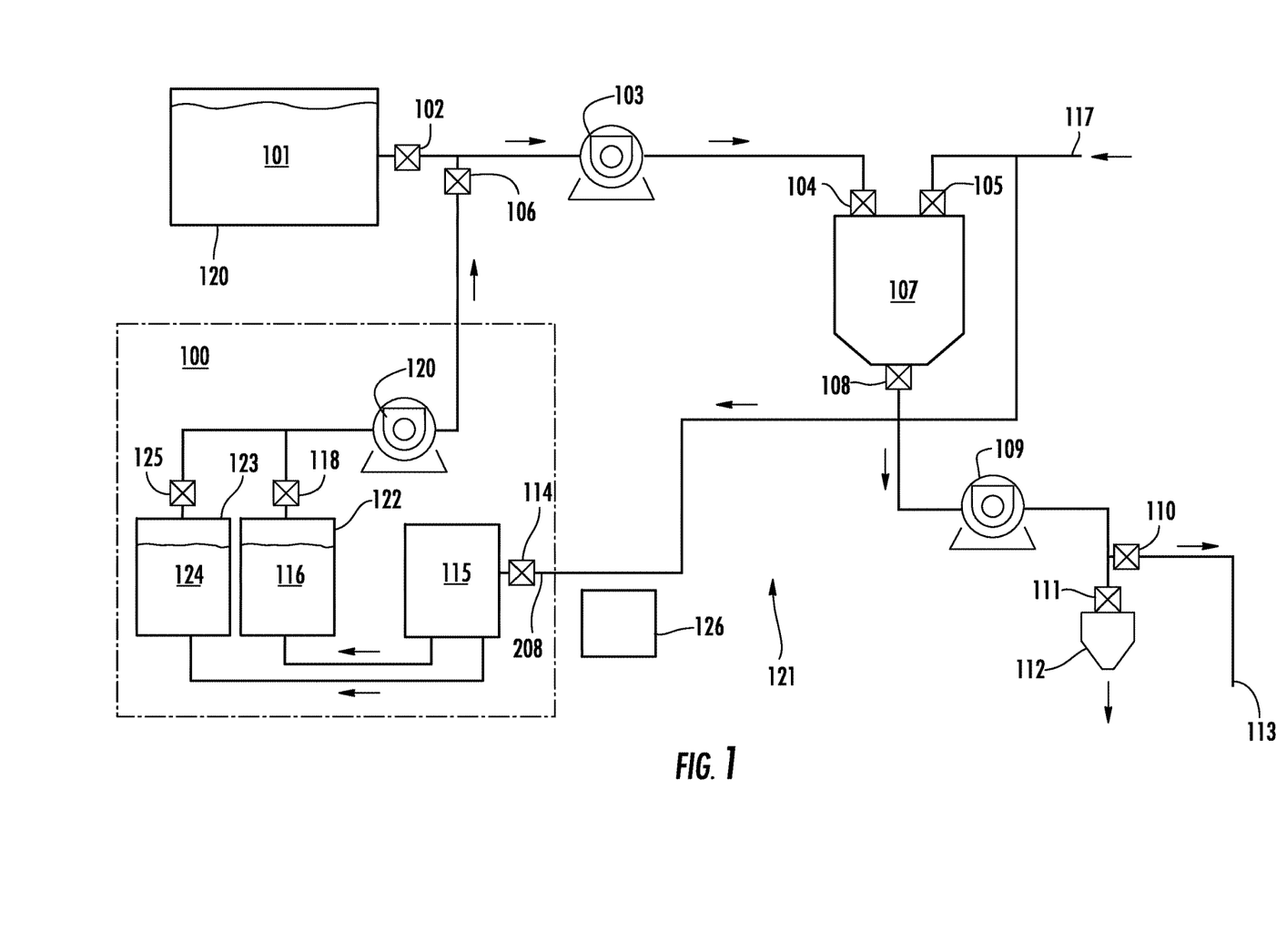
FIG. 1 shows apparatus in accordance with at least one aspect of the present disclosure comprising a dispensing system and an integrated sanitizing system.

An embodiment of a sanitizing system 100 in accordance with the present disclosure is shown in FIG. 1. As shown in FIG. 1, sanitizing system 100 may be integrated with a liquid or beverage dispensing system 121. The beverage dispensing apparatus or system 121 may be used to dispense a concentrated beverage. The beverage dispensing system 121 may comprise a container 120, with concentrate 101, mixer 107, pumps 103 and 109, dispensing nozzle 112, and valves 102, 104, 105, 108, 110, 111. The sanitizing system 100 may comprise a processing unit or electrochemical cell 115, an input valve 114, an output valve 116, and a pump 118. Electrochemical cell 115 may comprise an electrolyzer.

When the beverage dispensing system 121 is in a dispensing mode, valves 106, 110 and 114 may be closed. In the dispensing mode, pump 103 may move concentrate 101 from container 120 into mixer 107, and valves 102 and 104 may be open. Water may be delivered to the mixer 107 from the water supply 117 and through valve 105. Water supply 117 may be any conventional drinking water supply, e.g., municipal tap water. After mixing in the mixer 107, the mixture of concentrate 101 and water may be pumped to nozzle 112 by pump 109, and further into a cup or other container (not shown) placed under nozzle 112.

In a sanitizing mode, valve 102 may be closed so that concentrate 101 does not flow from container 120 to pump 103. Valve 114 may be open or opened and water from water supply 117 may be directed into electrochemical cell 115. Electrochemical cell 115 may be configured to produce two solutions: an anolyte solution 116 and a catholyte solution 124. Anolyte solution 116 may be stored in tank 122, and catholyte solution 124 may be stored in tank 123. When a sufficient amount of each solution may be produced, valve 118 may be opened and pump 120 may move the anolyte solution 116 into the dispensing system 121, e.g., through valve 106. At the same time pumps 109 and 103 may also be put into operation to move the anolyte solution 116 along the dispensing system 121 and across internal surfaces of components of the dispensing system. The anolyte solution may pass through components of the dispensing system 121, for example, but not by way of limitation, pump 103, mixer 107 and pump 109. The anolyte solution may then be sent to drain 113. For this embodiment, valve 111 may be closed and valve 110 may be open when the apparatus is in the sanitizing mode.

When a predetermined amount of anolyte may be pumped through the dispensing system, valve 118 may be closed, and valve 125 may be opened so that pump 120 may move the catholyte solution 124 through the dispensing system in the same manner as done for the anolyte solution 116. After a predetermined amount of the catholyte solution 124 may be pumped through the dispensing system, valve 125 may be closed, and the dispensing system may then be ready for operation in the dispensing mode.

In an alternative embodiment, the order may be reversed and a predetermined amount of the catholyte solution 124 may be pumped through the dispensing system 121, and then a predetermined amount of the anolyte solution 122 may be pumped through the dispensing system 121.

In an embodiment, electrochemical cell 115 may comprise a first electrochemical cell (not shown) and a second electrochemical cell (not shown). In an embodiment, the first electrochemical cell may produce the anolyte solution 122, and the second electrochemical cell may produce the catholyte solution 124. In an embodiment, the first electrochemical cell may produce the anolyte solution 122, and the second electrochemical cell may produce the catholyte solution 124 at the same time or about the same time. Thus, the anolyte solution 116 may be accumulated in tank 122 at the same time or about the same time that the catholyte solution 124 may be accumulated in tank 123.

In an embodiment, both the anolyte solution 116 and the catholyte solution 124 may be received by pump 120 at the same time or about the same time, and then sent through the dispensing system 121 at the same time or about the same time.

Figure 2:
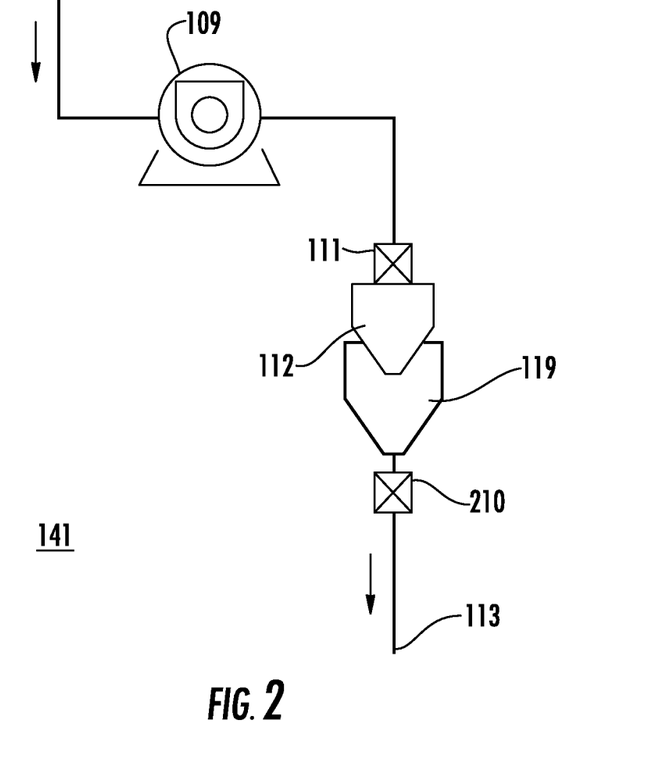
FIG. 2 shows a portion of the apparatus shown in FIG. 1 in accordance with at least one aspect of the present disclosure.

In an embodiment, the anolyte solution 116 and the catholyte solution 124 may be directed through the nozzle 112 to disinfect or sanitize interior surfaces of the piping leading to valve 111, interior surfaces of valve 111, and interior surfaces of nozzle 112. In this embodiment, a receiving plate 119 may be connected to the drain 113, as shown in FIG. 2. Thus, disinfecting or sanitizing water may be directed through nozzle 112 to receiving plate 119, and through valve 210, as shown in FIG. 2.

As shown in FIG. 1, the sanitizing system 100 may comprise an electrochemical cell 115, a tank 122 for an anolyte solution 116, a tank 123 for a catholyte solution 124, input valve 114, output valves 118 and 125, and a pump 120. As shown in FIG. 1, output valve 118 corresponds to the outlet of tank 122, and output valve 125 corresponds to the outlet of tank 123.

In an embodiment, a controller 126 may control operation of the sanitizing system 100, including components thereof. In an embodiment, controller 126 may control dispensing system 121, including components thereof.

Those of ordinary skill in the art will recognized that in accordance with the present disclosure, in an embodiment, flow rates, and operation the electrochemical cell(s) may be coordinated or controlled in an amount and manner that desirable ion and chemical radical concentration in water is achieved.

Figure 3:
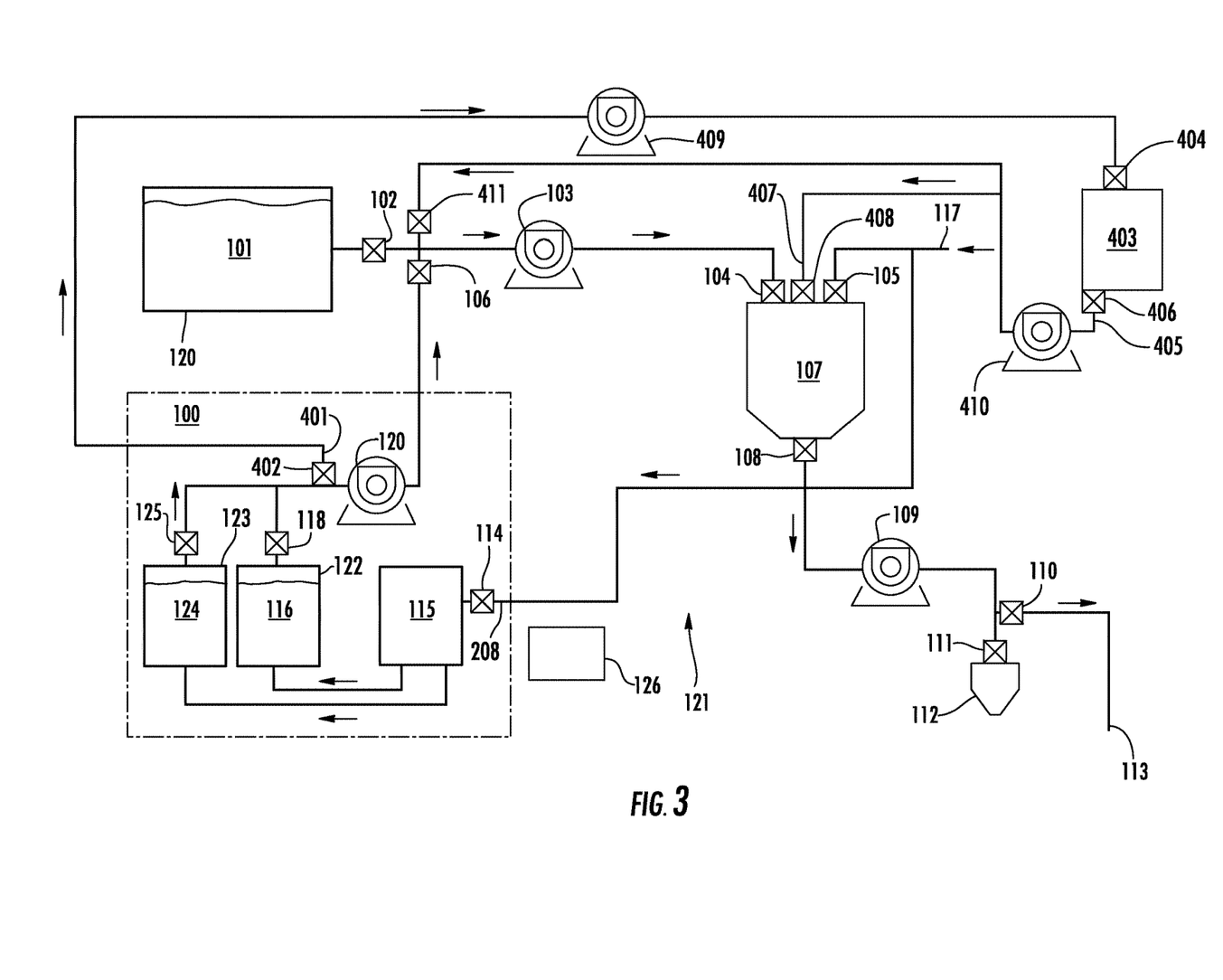
FIG. 3 shows apparatus in accordance with at least one aspect of the present disclosure comprising a dispensing system and an integrated sanitizing system.

In an embodiment, processing unit 115 may be utilized to clean water from water supply 117. In an embodiment, processing unit 115 can be utilized not only for production of anolyte and catholyte solutions to sanitize the dispensing system 121, but also may be used to clean water from the water supply 117. As shown in FIG. 3, in such an embodiment, processing unit 115 will ultimately have two outputs or outlets, one outlet 209 containing anolyte and/or catholyte solution(s) to sanitize the dispensing system 121, and a second outlet 401 containing water, where ions and chemical radicals produced by processing unit 115 may be removed by apparatus 403, thereby resulting cleaner water than water from water supply 117. As shown in FIG. 3, water treated by processing unit 115 may exit unit 115 through valve 402 and second outlet 401. The water may be sent through valve 404 and into apparatus 403. In apparatus 403, ions and chemical radicals in the water may be removed, and water treated in apparatus 403 may exit apparatus 403 through valve 406 and outlet 405. As shown in FIG. 3, water treated in apparatus 403 may be used as a water supply 407 to mixer 107. Water supply 407 may be used in combination with water supply 117 to supply water to mixer 107, or may be used as an alternative water supply to mixer 107. Water supply 407 may flow through valve 408 before flowing into mixer 107. A pump 409 may be used to send water from processing unit 115 to apparatus 403. A pump 410 may be used to pump water from apparatus 403 to mixer 107. Thus, water treated in apparatus 403 may be used as a water supply 407 to mixer 107, and be combined with concentrate 101 when desired to prepare a beverage using water that has been cleaned using the combination of processing unit 115 and apparatus 403.

Those of skill in the art will recognize that in accordance with the present disclosure, any suitable apparatus 403 may be used to remove from water ions and chemical radicals produced by processing unit 115. For example, apparatus 403 may be the same or similar to processing unit 115. For example, apparatus 403 may comprise an electrochemical cell. The electrochemical cell of apparatus 403 may convert an anolyte solution 116 to a non-anolyte solution. The electrochemical cell of apparatus 403 may convert a convert a catholyte solution to a non-catholyte solution. The non-anolyte solution and the non-catholyte solution produced in apparatus 403 may each comprise water that has been treated in by processing unit 115 and apparatus 403. The non-anolyte solution and the non-catholyte solution produced in apparatus 403 may comprise water that is cleaner than water from water supply 117. The non-anolyte solution and the non-catholyte solution produced in apparatus 403 may comprise water that is ion-free and chemical radical-free.

Apparatus 403 may comprise activated carbon to remove ions and chemical radicals produced by the processing unit 115.

Automation of a sanitization process in accordance a least one aspect of the present disclosure can be done according to the following steps.

a. The sanitization process may be started by pre-set timer or by a received input, for example, by receiving a "start signal."

b. A beverage dispensing system 121 may enter into a sanitizing mode wherein valve 102 and valve 111 may be closed, and wherein valve 110 may be opened.

c. Valve 114 may be opened to fill processing unit 115 from inlet 208, which in turn may be supplied with water from water supply 117. When processing unit 115 is filled to a desired level, valve 114 may be closed.

d. The water in processing unit 115 may be electrochemically activated for a time sufficient to achieve a desired concentration ions and chemical radicals in the water for a given temperature of the solution. In an embodiment, the desired concentration is the maximum concentration of ions and chemical radicals in water for a given temperature of the solution. An anolyte solution 116 produced by processing unit 115 may be accumulated in tank 122. A catholyte solution 124 produced by processing unit 115 may be accumulated in tank 123. Valve 118 may be opened and pumps 120, 103, and 109 may move the treated or activated water through dispensing system 121 when desired to send the anolyte solution 116 through components of dispensing system 121. Valve 125 may be opened and pumps 120, 103, and 109 may move the treated or activated water through dispensing system 121 when desired to send the catholyte solution 124 through components of dispensing system 121.

e. Steps a-d may be repeated more than one time to achieve desirable disinfection and cleaning efficacy, i.e. commercial sanitization.

f. After step e is completed, if desired, water can be treated in apparatus 403 as previously discussed, and the water treated in apparatus 403 may be sent to a location in the dispensing system 121 to purge any electrochemically-activated water remaining in dispensing system 121. Thus, water can be treated in apparatus 403 and sent from apparatus 403, e.g., through valve 411, which is positioned upstream of pump 103. The water treated in apparatus 403 can thus flow through valve 411 and downstream components, e.g., pump 103, valve 104, mixer 107, valve 108, pump 109, valve 111, and nozzle 112. Alternatively, although not shown in FIG. 3, water treated in apparatus 403 can be sent to valve 106, and then through downstream components, e.g., pump 103, valve 104, mixer 107, valve 108, pump 109, valve 111, and nozzle 112.

In an aspect the present disclosure provides an apparatus comprising a dispensing system in combination with a sanitizing system. The combination may have a dispensing mode and sanitizing mode. The dispensing system may comprise a first valve and at least one component, the at least one component comprising an inner surface. The first valve may have an open position to send a free-flowing material to the at least one component when the combination is in the dispensing mode. The first valve may have a closed position when the combination is in the sanitizing mode. The sanitizing system comprises a processing unit. The processing unit may comprise an electrochemical cell configured to produce an anolyte solution and a catholyte solution, a first tank configured to receive the anolyte solution, and a second tank configured to receive the catholyte solution. The sanitizing system may comprise a second valve. The second valve may have an open position to send the anolyte solution from the first tank and the catholyte solution from the second tank to the at least one component when the combination is in the sanitizing mode. The second valve may have a closed position when the combination is in the dispensing mode.

In a further aspect of the disclosure, the at least one component may be selected from the group consisting of a pipe, a mixer, a chamber, a reservoir, a pump, a third valve, and a nozzle.

In a further aspect of the disclosure, the apparatus comprises at least one pump. The at least one pump may be configured to send the anolyte solution from the first tank and the catholyte solution from the second tank across an interior surface of the component when the combination is in the sanitizing mode.

In a further aspect of the disclosure, the apparatus comprises piping. The piping may be configured to send the anolyte solution from the first tank and the catholyte solution from the second tank to the at least one component. The piping may be configured to circulate the anolyte solution and the catholyte solution from the at least one component back to the processing unit, e.g., after each of these solutions has made at least one pass across the interior surface of the component. In an embodiment, the piping may be configured to circulate the anolyte solution from the first tank to the component and back to the first tank after the anolyte solution has made at least one pass across the interior surface of the component. In an embodiment, the piping may be configured to circulate the catholyte solution from the second tank to the component and back to the second tank after the catholyte solution has made at least one pass across the interior surface of the component.

In a further aspect of the disclosure, the apparatus may comprise a drain. The drain may be configured to receive the anolyte solution from the first tank and the catholyte solution from the second tank after each of those solutions has made at least one pass across the interior surface of the component.

In a further aspect of the disclosure, the apparatus may be configured to send the anolyte solution from the first tank and the catholyte solution from the second tank across the interior surface of the component until the interior surface of the component has been sanitized.

In a further aspect of the disclosure, the electrochemical cell may comprise a first electrochemical cell configured to produce an anolyte solution, and a second electrochemical cell configured to produce a catholyte solution.

In a further aspect of the disclosure, the first electrochemical cell may be configured to produce the anolyte solution and second electrochemical cell may be configured to produce the catholyte solution at the same time or about the same time.

In a further aspect of the disclosure, the electrochemical cell may be configured to produce the anolyte solution at different time than the catholyte solution.

In a further aspect of the disclosure, the apparatus may comprise a first outlet valve for the first tank, and a second outlet valve for the second tank. The at least one pump may be configured to receive the anolyte solution from the first outlet valve and receive the catholyte solution from the second outlet valve.

In a further aspect of the disclosure, the second outlet valve may be configured to be in a closed position when the first outlet valve is in an open position, and the combination is in the sanitizing mode.

In a further aspect of the disclosure, the first outlet valve may be configured to be in a closed position when the second outlet valve is in an open position, and the combination is in the sanitizing mode.

In a further aspect of the disclosure, the second outlet valve may be configured to be in an open position and the first outlet valve may be configured to be in an open position when it is desired to pump the catholyte solution and the anolyte solution through the at least one pump at the same time.

In a further aspect of the disclosure, the free-flowing material is a food product.

In a further aspect of the disclosure, the food product is a beverage concentrate.

In a further aspect of the disclosure, the apparatus comprises a device configured to receive the anolyte solution and the catholyte solution from the sanitizing system and remove ions and chemical radicals from the solutions to generate an ion-free, chemical radical-free water. The apparatus may be further configured to supply the ion-free, chemical radical-free water across the interior surface of the component to purge any anolyte solution or catholyte solution from the dispensing system.

In a further aspect of the disclosure, the apparatus comprises a device configured to receive the anolyte solution and the catholyte solution from the sanitizing system and remove the ions and chemical radicals to generate an ion-free, chemical radical-free water, the apparatus further configured to supply the ion-free, chemical radical-free water to a mixer, the mixer configured to mix a beverage concentrate with the ion-free, chemical radical-free water when the combination in the dispensing mode.

In another aspect of the disclosure, an apparatus may be provided comprising a beverage dispensing system in combination with a sanitizing system, the combination having a dispensing mode and sanitizing mode. The beverage dispensing system may comprise a first valve and a mixer. The mixer may comprise an inner surface. The mixer may be configured to mix a beverage concentrate with water when the combination is in the dispensing mode. The first valve may have an open position to send a liquid to the mixer when the combination is in the dispensing mode. The first valve may have a closed position when the combination is in the sanitizing mode. The apparatus may comprise a processing unit. The processing unit may comprise an electrochemical cell configured to produce an anolyte solution and a catholyte solution, a first tank configured to receive the anolyte solution, and a second tank configured to receive the catholyte solution. The sanitizing system may comprise a second valve. The second valve may have an open position to send the anolyte solution from the first tank and the catholyte solution from the second tank to the mixer when the combination is the sanitizing mode. The second valve may have a closed position when the combination is the dispensing mode.

In another aspect of the disclosure, a method for sanitizing interior surfaces of a beverage dispensing system is provided. The method may comprise receiving water in an electrochemical cell, generating an anolyte solution, receiving in a first tank the anolyte solution generated in the electrochemical cell, generating a catholyte solution, and receiving in a second tank the anolyte solution generated in the electrochemical cell. The method may comprise pumping the anolyte solution from the first tank through the beverage dispensing system, and pumping the catholyte solution from the second tank through the beverage dispensing system. The pumping of the anolyte solution and the catholyte solution through the beverage dispensing system may be for a sufficient time to sanitize an interior surface of a component of the beverage dispensing system.

In a further aspect of the disclosure, the method may comprise closing a first valve, the first valve at the outlet of a beverage concentrate supply.

In a further aspect of the disclosure, the method may comprise opening a second valve, the second valve located downstream of the first tank and the second tank.

In a further aspect of the disclosure, the method may comprise pumping of the anolyte solution and the pumping of the catholyte solution occurs at different times.

In a further aspect of the disclosure, the method may comprise pumping of the anolyte solution and the pumping of the catholyte solution occurs at the same time.

As will be recognized by those skilled in the art, the above described embodiments may be configured to be compatible with fountain system requirements, and can accommodate a wide variety of fountain offerings, including but not limited beverages known under any PepsiCo branded name, such as Pepsi-Cola®, and custom beverage offerings. The embodiments described herein offer speed of service at least and fast or faster than conventional systems. The embodiments described herein may be configured to be monitored, including monitored remotely, with respect to operation and supply levels. The embodiments described herein are economically viable and can be constructed with off-the-shelf components, which may be modified in accordance with the disclosures herein.

Those of skill in the art will recognize that in accordance with the disclosure any of the features and/or options in one embodiment or example can be combined with any of the features and/or options of another embodiment or example.

The disclosure herein has been described and illustrated with reference to the embodiments of the figures, but it should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only and the disclosure is not limited except by the following claims and their equivalents.

We claim:

1. A method of sanitizing a beverage dispensing system, comprising:
dispensing a free-flowing material beverage concentrate through a pump and a first valve to at least one component of a beverage dispensing system when the beverage dispensing system in combination with a sanitizing system is in a beverage dispensing mode, the at least one component having an interior surface;
receiving water in the at least one component from a water supply fluidly connected to the at least one component;
receiving water from the water supply from a point before the at least one component in an electrochemical cell of the sanitizing system;
generating an anolyte solution in the electrochemical cell;
receiving in a first tank the anolyte solution generated in the electrochemical cell;
generating a catholyte solution in the electrochemical cell;

receiving in a second tank the catholyte solution generated in the electrochemical cell;

switching from the beverage dispensing mode to an electrochemically-activated water sanitizing mode;

pumping the anolyte solution from the first tank through a second valve, the pump, and across the interior surface of the at least one component of the beverage dispensing system; and pumping the catholyte solution from the second tank through the second valve, the pump, and across the interior surface of the least one component of the beverage dispensing system, wherein the pumping of the anolyte solution and the catholyte solution through the second valve and across the interior surface of the least one component of the beverage dispensing system occurs when the combination of the beverage dispensing system and the sanitizing system is in the sanitizing mode.

2. The method of claim 1 further comprising:
closing the first valve, the first valve at the outlet of a beverage concentrate supply and opening the second valve after closing the first valve so that the combination of the beverage dispensing system and the sanitizing system is switched from the dispensing mode to the sanitizing mode.

3. The method of claim 2 further comprising:
closing the second valve and opening the first valve after closing the second valve so that the combination of the beverage dispensing system and the sanitizing system is switched from the sanitizing mode to the dispensing mode.

4. The method of claim 1, wherein the pumping of the anolyte solution and the pumping of the catholyte solution occurs at different times.

5. The method of claim 1, wherein the pumping of the anolyte solution and the pumping of the catholyte solution occurs during an overlapping time period.

6. The method of claim 1, wherein the at least one component is selected from the group consisting of a pipe, a mixer, a chamber, a reservoir, a second pump, a third valve, and a nozzle.

7. The method of claim 1, further comprising sending the anolyte solution from the first tank and the catholyte solution from the second tank to the electrochemical cell after each of these solutions has each made at least one pass across the interior surface of the component.

8. The method of claim 7, further comprising draining the anolyte solution from the first tank and the catholyte solution from the second tank after each of these solutions has made at least one pass across the interior surface of the component.

9. The method of claim 7, further comprising sending the anolyte solution from the first tank and the catholyte solution from the second tank across the interior surface of the component until the interior surface of the component has been sanitized.

10. The method of claim 1, wherein the electrochemical cell comprises a first electrochemical cell and a second electrochemical cell, wherein generating the anolyte solution occurs in the first electrochemical cell and the generating the catholyte cell solution occurs in the second electrochemical cell.

11. The method of claim 10, wherein generating the anolyte solution and the generating the catholyte solution occurs during an overlapping time period.

12. The method of claim 1, wherein generating the anolyte solution occurs at a different time than and the generating the catholyte solution.

13. The method of claim 1, further comprising opening a first outlet valve for the first tank, opening a second outlet valve for the second tank, receiving in a second pump the anolyte solution from the first outlet valve, and receiving in the second pump the catholyte solution from the second outlet valve.

14. The method of claim 13, further comprising having the second outlet valve in a closed position when the first outlet valve is in an open position, and the combination is in the sanitizing mode.

15. The method of claim 13, further comprising having the first outlet valve in a closed position when the second outlet valve is in an open position, and the combination is in the sanitizing mode.

16. The method of claim 13, further comprising having the second outlet valve in an open position and the first outlet valve in an open position, and pumping the catholyte solution and the anolyte solution through the second pump at the same time.

17. The method of claim 1, further comprising receiving in a device the anolyte solution and the catholyte solution from the sanitizing system and removing ions and chemical radicals from the solutions and generating an ion-free, chemical radical-free water, and supplying the ion-free, chemical radical-free water across the interior surface of the component to purge any anolyte solution or catholyte solution from the dispensing system.

18. The method of claim 1, further comprising receiving in a device the anolyte solution and the catholyte solution from the sanitizing system and removing the ions and chemical radicals to generate an ion-free, chemical radical-free water, supplying the ion-free, chemical radical-free water to a mixer, and mixing in the mixer a beverage concentrate with the ion-free, chemical radical-free water when the combination is in the dispensing mode.

19. A method of sanitizing a beverage dispensing system, comprising:
dispensing a free-flowing material beverage concentrate through a pump and a first valve to a mixer of a beverage dispensing system when the beverage dispensing system in combination with a sanitizing system is in a beverage dispensing mode, the mixer having an interior surface;

receiving water in the mixer from a water supply fluidly connected to the mixer during the dispensing of the free-flowing material beverage concentrate;

receiving water from the water supply from a point before the mixer in an electrochemical cell of the sanitizing system;

generating an anolyte solution in the electrochemical cell;
receiving in a first tank the anolyte solution generated in the electrochemical cell;

generating a catholyte solution in the electrochemical cell;
receiving in a second tank the catholyte solution generated in the electrochemical cell;

switching from the beverage dispensing mode to the electrochemically-activated water sanitizing mode;

pumping the anolyte solution from the first tank through a second valve, the pump, and across the interior surface of the mixer; and pumping the catholyte solution from the second tank through the second valve, the pump, and across the interior surface of the mixer, wherein the pumping of the anolyte solution and the catholyte solution through the second valve and across the interior surface of the mixer occurs when the combination of the beverage dispensing system and the sanitizing system is in the sanitizing mode.

* * * * *